(12) United States Patent
Jakubowski et al.

(10) Patent No.: US 7,476,074 B2
(45) Date of Patent: Jan. 13, 2009

(54) METHOD FOR REALISING A SUBMERGED FLOATING FOUNDATION WITH BLOCKED VERTICAL THRUST FOR THE COORDINATED PRODUCTION OF MARICULTURE AND ELECTRICAL ENERGY USING WIND IN OPEN SEA CONDITIONS AND SUBMERGEABLE FLOATING FOUNDATION FOR CARRYING LOADS TO BE USED IN SAID METHOD

(75) Inventors: Martin Jakubowski, Hanau (DE);
Giovanni Boschetti, Farra D'Alpago (IT)

(73) Assignee: Enertec AG, Ruggell (LI)

( * ) Notice: Subject to any disclaimer, the term of this patent is extended or adjusted under 35 U.S.C. 154(b) by 0 days.

(21) Appl. No.: 10/539,403

(22) PCT Filed: Dec. 16, 2003

(86) PCT No.: PCT/IB03/06011

§ 371 (c)(1),
(2), (4) Date: Jun. 17, 2005

(87) PCT Pub. No.: WO2004/055272

PCT Pub. Date: Jul. 1, 2004

(65) Prior Publication Data

US 2006/0062676 A1    Mar. 23, 2006

(30) Foreign Application Priority Data

Dec. 17, 2002   (IT) ........................ BA2002A0047

(51) Int. Cl.
*F03D 1/00*    (2006.01)

(52) U.S. Cl. ........................................... 415/1
(58) Field of Classification Search .................... 415/7; 416/85, DIG. 6; 119/208, 221
See application file for complete search history.

(56) References Cited

U.S. PATENT DOCUMENTS

| 2,394,764 | A | * | 2/1946 | Greulich ...................... 114/267 |
| 4,645,379 | A | | 2/1987 | Grimsley et al. |
| 4,764,313 | A | * | 8/1988 | Cameron et al. ................ 415/7 |
| 5,617,813 | A | * | 4/1997 | Loverich et al. ............ 119/223 |

FOREIGN PATENT DOCUMENTS

| DE | 10219062 A1 | | 11/2003 |
| EP | 1106825 A2 | | 6/2001 |
| EP | 1174336 A1 | | 1/2002 |
| GB | 849887 | | 9/1960 |
| GB | 849887 A | * | 9/1960 |
| GB | 2378679 A | | 2/2003 |
| JP | 2002285951 A | | 10/2002 |
| JP | 2002285951 A | * | 10/2002 |
| JP | 2002285952 A | | 10/2002 |
| WO | WO 200173292 A1 | * | 10/2001 |
| WO | WO-02/10589 A1 | | 2/2002 |

\* cited by examiner

*Primary Examiner*—Richard Edgar
(74) *Attorney, Agent, or Firm*—Timothy X. Gibson; Gibson & Dernier LLP (57) ABSTRACT

The invention refers to a novel submerged floating foundation body (6,13;16) which is mounted to the bottom (1) of the sea or a lake by cables or chains (3) and supporting a structure especially a wind turbine tower (10) below the wave motion area (8). It may have also a mariculture cage (7) on said floating body.

23 Claims, 4 Drawing Sheets

METHOD FOR REALISING A SUBMERGED FLOATING FOUNDATION WITH BLOCKED VERTICAL THRUST FOR THE COORDINATED PRODUCTION OF MARICULTURE AND ELECTRICAL ENERGY USING WIND IN OPEN SEA CONDITIONS AND SUBMERGEABLE FLOATING FOUNDATION FOR CARRYING LOADS TO BE USED IN SAID METHOD

The present invention relates to the combination of the innovative techniques of conception, project design and realisation of a submerged floating foundation, combined with the use and realisation of the upper part of said foundation as a submerged support base for a wind turbine installation in combination with mariculture facilities, also positioned on the upper part of said foundation. In fact, the nature of the innovation does not concern only the realisation of a floating foundation below the level of wave motion, that already represents an innovation in state of the art technology and construction, but mainly concerns the combination of techniques and methods that permit both the realisation of wind turbines and mariculture at the same time.

In fact, no invention in the current state of this technical art provides for this type of use in this combination, which is also innovative in each of its single components.

In fact, the realisation of submerged floating foundations with blocked vertical thrust—that therefore take greatest advantage of the principal of Archimedes—is an innovation in itself, but an even newer concept relates to the method of construction, realisation, installation and transport of the foundation.

The wind turbine energy production installation is also innovative.

The use of wind turbines is increasing constantly, and this has been demonstrated by the reduced availability of the better positions on land for the installation of wind turbine plants. For this reason, great attention is being paid to the idea of open sea installations.

Within this application "sea" includes also "lake".

At the present moment, many projects are underway, or under development, but these concern projects that use very common technology.

One technique foresees that the foundations be dug into the sea bottom, and that the turbine be fixed on top of the foundation. This is a very costly process and harmful to the surrounding environment, both during construction, as well as during removal.

A second technique foresees a floating foundation on the water surface, anchored to the sea bottom with cables. However this technology has a disadvantage in that it is sensitive to position changes in the sea bottom caused by water and wave movement.

Lastly, a patent foresees a wind turbine fixed to the sea bottom and maintained in position by anchoring systems. But this patent presents stability problems over a period of time and is very costly to realise.

None of these technologies can be integrated with mariculture. The innovation concerning the mariculture installation is composed of various elements.

First of all, the constructive technology is extremely innovative according to the present invention.

Secondly, the fact that the installation uses the foundation as a support base provides greater stability, and above all, permits the farming of any type of fish species, including those that need the sea bed as their habitat.

Thirdly, an installation such as that described in this invention is completely automatic, including all the aspects concerning fish feeding.

Even though they are coordinated to realise a single product, the principle technical aspects of this innovative concept each represent an innovative and individual realisation method independent of each other, that however, when coordinated with each other permit the realisation of a unique installation with far-reaching effects, also from an economical point of view because of the considerable reduction in manufacturing costs.

The installation is also innovative from the viewpoint of the influence of its productive capacity in a wide range of different and absolutely diversified technological and productive sectors.

When examining the innovative project design of this product as a whole, it is essential that each single innovative method and technology of which it is composed must be taken into consideration at the same time, since these components when combined together form a unique innovative product with multiple applications, while at the same time, when considered separately, each individual component represents an innovative product that can be used independently of the other components.

We will begin with the method for the construction of a submerged foundation, which is an extremely important aspect. The foundation is composed of a cylindrical or polygonal shaped structure with blocked vertical thrust, crossed internally by radial arms, that can be filled with air or different gas, and stabilised with ballast. Diversification is also possible. They can be transported and stabilised using ballast, crossed internally by spokes as far as to the immersion position, to be anchored to the sea bed using tension chains or cables that also connect it to submerged counterweights and that make it permanently fixed and able to resist weight, pressure, and stress, even when combined together, of an intensity equal to the vertical thrust of the floating foundation.

This is composed of a single structure developed both in horizontal and vertical directions, as shown in drawings. The structure described herein is hexagonal, but it can be built in cylindrical or polygonal form with the same characteristics.

It is composed of an external hollow ring in the shape of a polygon or a circle that forms the external body of the structure.

A variable number of hollow radial arms extend from this external ring to connect the ring (donut) to the central body of the foundation, which has an additional lower part in the steel version, also of cylindrical or polygonal shape.

In realty, the structure is composed of two cylindrical or polygonal hollow concentric bodies of different sizes, the external body being much larger than the central body, and connected by radial arms that connects the two bodies together.

Naturally the arms that connect the two hollow bodies are also submerged, floating and constructed of material that can be filled with air or other gases.

The central body is smaller in size than the external body of the foundation is developed upwards (and downwards in the steel version) to extend further than the foundation ring towards the top (and the bottom in the steel version).

The internal circular structure of the central body acts also as a container for the equipment that transforms and exports the energy produced by the wind turbine constructed above that will be described in greater detail further on, containing for example, a transformer, a generator, and a computerized control system as well as it is equipment for the mariculture facility.

The structure realised in this manner represents a single foundation body constructed in a single piece and without the assembly of the individual parts, that are, however, separately appreciable, such as the external ring, the radial arms and the central body.

The single body concept of the foundation is designed and constructed to increase the stability and resistance to the forces and loads.

The foundation will not have a uniform support base, since said base will be empty in certain points, and others, that is, those constructed with material that can be filled with air or other gases and that form the polygons and the radial arms, can be filled with air or other gases.

In order to simplify the description of the foundation, one can say that the foundation has a shape of a wagon wheel with spokes that connecting the external ring to the internal hub, which employs a cylinder at the hub centre that crosses through the wheel.

The centre core that develops in a vertical direction towards the surface of the water in calm sea conditions will have a passageway around the external perimeter that can be used both as a working platform as well as access to the interior of the hollow body containing the service equipment that will be described further on.

Once the foundation has been positioned under sea level, access to the passageway will be possible by boat or by using a "draw-bridge" type access. The structure can be constructed in steel, reinforced concrete, vibrated reinforced concrete, or prestressed concrete or any other material suitable for the same purpose, e.g. glasfiber enhanced polymers or the like.

It can be constructed in a single piece, in modules or components for assembly, fitted together internally and externally with special connecting seals, including flanged seals, or by on-site casting or welding. It can be constructed on-site in a single solution, or built industrially; this also applies to all single components.

Special hooks will be attached on the lower and upper parts of the external wall of the foundation at the points where the radial arms intersect with the perimeter for anchoring the tension cables. Other hooks for cables will be positioned along the edge of the central body of the foundation at the ends of the radial arms, both on the upper and lower parts. Tension cables will be attached to said hooks and will serve a double function.

The cables that connect the perimeter of the foundation to the central body, both at the upper part towards water level and the lower part in the direction of the sea bottom, will act to provide the structure with the necessary stiffness and therefore to connect the external ring to the central body of the foundation in a stable manner. This connection is even more necessary because the central body of the foundation will have a vertical projection both downwards towards the sea bottom, and upwards towards the surface of the water.

The chains or cables that will be attached to the hooks on the lower edge of the external ring of the foundation will be connected to counterweights that will be placed on the seabed to provide the necessary stability to the whole system in order to compensate all loads acting on the system and to counter the physical forces present in the area.

The connecting tension chains or cables between the foundation and the counterweights will be positioned in vertical as well as diagonal directions in order to block any movement of the system.

Said chains or cables will be full steel cables or equivalents thereof with variable diameters according to the different necessities and the stress to which they are subject.

The size of the cables themselves will depend on the s size of the various loads in the specific marine environment, in relation to the thrust that the structure will receive in order to be able to compensate the overturning moment of the whole system including all components of the present invention, and therefore also the structure that will rise well above sea level for the production of electricity from eolian wind energy.

As stated previously, the foundation is not completely full, to form a plane surface for two technical reasons.

The first reason is the fact that since it is immersed in the water well under the level of the wave movement, no less than ten meters and at variable depths, the foundation has a specific weight that is much lighter than the weight it would have in normal gravitational and aerobic conditions outside the water.

The second reason depends on the fact that considering the interaction between the physical laws relative to fluids and the structure itself, in the case that there would not be empty spaces between the radial arms, the foundation would receive an excessive thrust that would request unnecessarily greater costs for the production, of the foundation and the mooring (anchoring) system.

According to the description provided, and on examining the drawings it is easy to note that the steel foundation 6 represents a structure equipped with radial arms 13 that act as air chambers with the space between the empty spokes, while in the case of reinforced concrete and vibrated or precompressed reinforced concrete foundations 16, the ring-body is composed of various air chambers between the structural walls.

The sizes of the foundations vary according to the sites at sea where they are positioned, as well as the height of the wind turbine tower 10; however, fixed proportions exist between the various values, which are established by the laws of physics.

As an indication, considering a foundation with a variable diameter between 40 and 60 meters, the central unit where the tower 10 is fixed will have a diameter no less than 5 meters, the two cylindrical parts of the central body on the vertical axis have to be about 15 meters, (for the steel version only) in the upwards and in the downwards direction, while for the reinforced concrete and vibrated or precompressed reinforced concrete foundations, no downwards central body part is foreseen.

Given this dimension of values, the ideal quota for anchoring the foundation to the seabed using the system described here, would be between 10 and 25 meters below water surface level.

The quota for positioning the foundation will be calculated, naturally taking into consideration not only the situation in calm sea conditions, but also the maximum historical wave height as well as the amplitude of tide reached under strong wave motion.

The innovations represented following this realisation method for similar submerged floating foundations are numerous, not only with reference to the wind turbine structure itself that is developed both vertically and horizontally, but also with reference to the extreme stability that can be obtained with this method.

The foundation is also innovative in its realisation because as well as other aspects, it eliminates existing problems with techniques currently in use based on a system of piles driven into the sea bed and assembled together on side, which requires multiple use of heavy cranes in open sea.

On the other hand, with the method according to the present invention it is possible to realise a submerged floating foundation, that, in spite of the fact that it is not composed of single plane surface, can be attached to the sea bed with all the characteristics of stability and safety that permit the submerged foundation to be used a base for constructions that can rise even to considerable heights above sea level.

In fact, the realisation process according to this invention provides a submerged support base, suspended below the wave motion level area.

The submerged platform with blocked vertical thrust that can be filled with air is composed of a single polygonal or circular body, crossed by radial arms, and developed in a vertical direction in the centre both upwards and downwards, but which, for the example illustrated in the present invention, is positioned several meters below the wave motion level to make it stable even under extreme weather conditions.

The aims of said innovative method are numerous, and are directed on one hand, at the realisation of a submerged floating foundation, and on the other at the realisation of rising constructions based on said foundation, without the danger of the slightest oscillation, since they are not based directly on the sea bed, but below the wave motion level, and in fact, are integral with it.

Another aim of the innovation is to realise on the upper level of the submerged foundation, various closed, rigid and permeable structures that may reach the water surface level, and which can be used for certain activities, of various entity according to the size of the structure, directed at farming of marine species, permitting fish farming even of those species that need a bottom as their habitat.

In the case where the foundation has a hexagonal shape, these structures can form the sixth of the hexagon.

This means that each polygon formed by the intersection on the foundation between the radial arms and the two hollow bodies will compose a cage or tank dedicated to mariculture.

This means, therefore, that the number of polygons will be equal to the number of cages that will be positioned on the foundation and will be as high as the distance to just above water surface level. Said cages can be manufactured completely in synthetic netting, open or closed on the uppermost surface, or can have a bottom concrete base and netting walls, and also in this case can be open or closed on the top surface.

The upper part that protrudes from the surface of the water of the cages could be equipped completely or partially, with suitable floating structures with the double function of preventing the occasional exit of the farmed fish, as well as making the cages more visible in open sea.

The netting mesh on the cages can be of various gauges, sufficiently rigid to prevent tearing, however, this involves raising the wear threshold, therefore increasing the resistance and longer duration of the fish farming equipment, also making the structure more resistant to possible aggression by predators and underwater currents.

Moreover, the mesh must be sized to prevent the exit of the fish farmed inside the cages. Therefore it is possible to realise various mesh sizes according to the type of fish to be farmed.

The various solutions adopted for realising these cages will depend on the species to be farmed, taking into consideration the necessities linked with fish size and living conditions.

The method for attaching the cages to the foundation can also differ, according to the following systems:

Either using plastic or hard rubber lines, that are however sufficiently flexible to absorb shock produced by the waves, Or, fixed to the foundation using hooks equipped with elastic shock absorber lines that permit a certain level of elasticity against sea waves.

Uprights manufactured in elastic material could also be used as auxiliary attachment.

The choice of the cage hooks must always depend on the type of fish that is to be farmed, and its weight; as well as the needs for its living conditions.

Each cage can also be connected at one corner only, the most internal angle of the polygon that forms the cage, both at the bottom and at the top at water surface level, at the centre piling that will form the base of the wind turbine.

According to the type of fish to be farmed, nets can be lowered inside each of the cages to harvest the fish more easily.

Moreover, according to the type of fish, the cage can be used to create the biosystem conditions formed on the sea bed, to produce a submerged aquarium within which the water is supplied directly from the sea, and the food necessary for that particular species is natural and not artificial.

The installation facility is organised designed in a manner way so that supplementary feeding is possible for the fish in the cages, having an automatic feeding system with electricity supply from the onboard transformer.

Contrarily to current systems, the fact that these cages are separate permit the farming of different species at sea, including those that require the sea bed as habitat, making it possible also to farm crustaceans in general, including almost all types of shell fish, especially the bivalve species.

Therefore, the present invention provides the possibility of fish farming at sea, according to the species and in conditions that reproduce the natural habitat in which the species live and reproduce.

Moreover, the present invention facilitates the harvesting and transport of the fish to the coast ready for sale.

The first activity necessary for cage or tank recovery is the unhooking from the foundation base, performed by underwater divers. Following this stage, the recovery of the fish and transport to land is performed very easily, since each cage can be raised by cranes mounted on the working platform at the base of the wind turbine, that comprises the third combined element in the present invention, and that will be described further on. After the cages have been unhooked from the foundation, the cranes raise them until they are close to the surface of the water.

Cage recovery can be performed either using cranes mounted on the working platform of the wind turbines, several cranes may be positioned opposite each other, or the cages can be raised by cranes positioned on ships moored close to the installation.

Obviously, since all the cages are separate, the recovery operations can be performed individually and independently according to the particular needs of the fish harvest.

Once the fish have been harvested they are transported to the coast by motor vessels.

The objectives to be attained with this type of fish farming system are numerous, given the variety and wide range of fish species that can be farmed in this way using a single structure, but differentiated at the same time through the use of individual cages that permit diversified farming of different fish varieties.

Naturally it must be strongly emphasised that the fish species farmed in this manner remain in their own natural habitat and environmental conditions.

An automatised system will supply the fish food to each cage from one or more silos located inside the wind turbine tower, said silos are also operated by the electricity energy produced by the wind turbine through the transformer mounted on the installation.

In the case of lack of wind, and therefore lack of energy production, the feed distributors will be supplied by the accumulators mounted on the wind turbine system. inside the central body Or by wave energy which can be won by wave energy generators connected to the system. Of course the additional power supply may be also realized with solar cells mounted on the turbine tower.

The savings obtained with a system of this type for feed distribution to the cages reduce labour costs to a minimum.

The innovative interest of this installation, which is already an innovation in its present form, can be completed with the further addition of a wind turbine installation.

Said wind turbine installation uses the submerged foundation as a support base being inserted into the upper part of the foundation on which a "female" base is attached to the centre, either inserted or bolted to the centre of the circular piled tower or welded on the central body.

The base of the wind turbine would therefore be positioned in the centre of the submerged foundation with the fish fanning cages arranged in a circle around it.

The advantage of a layout of this type for industrial activities lies above all in the shared cost of the installation support structure that would be divided Up among the various productive activities.

A further advantage is represented by the particularly economical manner in which each part and area of the installation is used to best advantage.

The piled tower that rises above the water surface level is destined to act as a support for a wind turbine that would be mounted on the top of the structure, at a level that is higher than the wave motion level but that is appropriate but in proportion with the foundation base. This installation would be destined to produce electricity from wind energy.

The base of the wind turbine is circular, with a vertical construction composed of a tower built of steel, reinforced concrete, or precompressed, or vibrated reinforced concrete, with a height in proportion with the base of the foundation, destined to use the energy obtained from the wind turbine positioned on the top of the tower.

At the top of the piled tower is a nacelle containing the rotor, revolution multiplier and the generator.

Inside each piled tower is an electrical installation that conducts the electricity produced by the wind turbine and then sends it through a cable that transports the electricity to the shore, and partly to the accumulator that provides the supply to the mariculture food distribution system.

In fact the individual wind turbine units positioned in horizontal alignment parallel with each other and connected in sequence through cables, or through cables of a suitable capacity, may also transmit the electricity to a substation placed in one of the units.

The possibility of positioning the individual wind turbines in horizontal alignment, connected to each other, permits the installation of a single substation, thus contributing to an obvious reduction in cost for the transmission of the produced eolian energy electricity.

Another important aspect linked with the grouping of the wind turbines is the fact that this also reduces the running and maintenance costs of the installation.

One of the innovations of the present invention is represented by the fact that the size of the individual installations for mariculture will be calculated according to necessity, and will be supplied with electricity produced by each individual installation, contrarily to current methods that use diesel motors or cable connection to land for energy supply, implicating not only greater running and management costs, but also obvious problems concerning sea pollution in the areas in question.

The method and means used for the embodiment of the present invention is composed of the sequence and the coordination of certain activities and said means that when combined together provide an innovation that when considered as a whole is protected by the present invention according to the claims. It must be emphasised that many of the stages for the realisation of the installation are performed on site and directly on the fixed support provided by the foundation, thus avoiding the need for large ships as support for construction.

We will now illustrate the various stages involved in the realisation of the innovative installation that can be built using the different but combined project methods.

The first stage involves the preparation of the foundation that can be filled with air, and that is composed of a structure in cylindrical or polygonal form, inside which exists a second cylindrical or polygonal structure that is smaller than the external structure, but connected to the external structure by means of radial arms; the central part of the foundation represented by the smaller polygon is not flat, but rises vertically on both sides of the foundation.

Both the external and internal polygons of said structure that can be filled with air may be equipped with hooks for attaching chains or cables to provide tension the foundation towards the counterweights providing it with correct stability.

As well as being able to be filled with air, obviously the structure must be hermetic and hollow inside, and must have the appropriate weight that combines solidity with the capacity to float.

When building the foundation in the original form as described herein, it will be equipped with an adequate number of fixing hooks and provided with the relative number of hollow concrete blocks to be positioned on the seabed. The blocks can be positioned by burying them in the sand, or in cases where the seabed is not sandy the blocks can be positioned and covered completely with large grade gravel.

Instead of the counterweights drill anchors or the like may be provided in the sea bottom.

The construction stage of the air filled structure equipped with the relative fixing attachments should be performed on land, and once completed it can be transported to the selected area at sea.

Said foundation eliminates all the problems that occur with the realisation of similar foundations because as well as offering the possibility of a submerged level, in spite of the fact that certain parts are empty below the wave motion level, it also permits precise calibration of the foundation dimension not only in proportion with the depth of the sea bed, but also in proportion with the type of activity that will be performed on the upper part of the foundation. Transport is simple because the structure can be towed by ship on water without the need for stowage and without problems linked with size.

Once the foundation has been towed to its destination at sea, it is immersed using appropriate ballast application with removable positive or negative loading and/or the introduction of seawater inside the foundation and the hollow concrete anchoring blocks.

The air-filled structure is lowered to a safety level that must be just below the wave motion level, and then the ballast that was applied previously is removed gradually.

Said last activity involving the proportion of ballast to be pumped permits the positioning of the air-filled structure at the established immersion level.

Part of the ballast or mooring system is composed of hollow concrete blocks that can be positioned with total gravity on the seabed after having let out of the air inside the structure.

Once the blocks have been positioned on the sea bottom, and while the floating structure is positioned at a constant level, just below the wave motion level, the mooring chains and cables are attached to the fixing systems located on the of the counterweights positioned on the sea bottom.

Following this stage, the cables that tension the horizontal ring of the foundation with the central body are attached to the part that descends towards the seabed, and to the upper part of the central body.

The hollow concrete blocks may be filled with sand, if their position is not too deep.

Once the connecting chains or cables and counterweight bodies have been linked, the floating foundation will move in a stable position without oscillation or other movement by removing the ballast which was filled in previously.

At this point any remaining ballast in the foundation can be removed, except the ballast, which can be placed in the lower part of the central body to bring down the centre of gravity of the whole system. With the removal of the ballast, the foundation weight will be lightened with the result that because of the lighter weight it will receive a thrust in the upward direction from the sea bed that will exercise the tension of all the chains or cables attached to the counterweights on the sea bed, thus providing the foundation with the necessary stability.

Once these operations have been completed, the foundation will possess the high stability level necessary to permit the loading of any further equipment that is mounted above sea level, but that will be affected by wave motion to a minimum extent.

Moreover, the structures to be attached to the foundation may be the cages, each one positioned on the section of the foundation formed by the radial arms.

Each cage will be attached to the foundation using the various methods and according to the different type of structure described above, in a vertical position so that the top of the cage is slightly under the water surface level.

The cages or tanks will also be realised according to the type of species to be farmed. The methods described establish that the type of species to be contained in each cage will determine whether the cage will have a concrete base or not, according to whether the species in question needs a bottom for its habitat.

Standard maintenance of the cages and the nets mounted on the cages will be performed regularly by under water divers.

The cages will be raised regularly and placed on support boats using cranes for non-standard maintenance operations.

As described herein, the submerged floating foundation realised according to the embodiment and method of this invention, will be used not only for fish farming activities, but also for the production of electricity from wind energy.

It is obvious that the connection of conceptually individual facilities, such as the wind turbines and the fish farming system, and the connection of both systems in combination with one another and with the submerged floating foundation offers numerous advantages, represented among others, by the division of assembly costs, as well as the maintenance costs that will also be divided among the various activities concerned.

Moreover, this innovative realisation permits the use of energy produced by the wind turbines to supply the whole structure including the mariculture facility.

In this manner, although each part of the system is coordinated and directed at the realisation of a single innovative installation, it is possible to reduce costs not only during each stage of the realisation, but also on completion since the installation provides its own energy, reducing the running and maintenance costs of the whole complex to a great extent.

In fact, the concept of using the foundation base both as a container for fish farming as well as for wind turbines makes said innovative realisation method not only far more economical, because of the division of installation and maintenance costs, but also offers the obvious benefit of being able to reduce costs during operations and take advantage of all available space on the structure, so that each segment has an individual and separate purpose, but coordinated with each other at the same time.

Once the foundation structures and counter-weights have been positioned and attached, it is possible to program the operations for the setting up of the wind turbine.

The following stage involves the positioning of the circular piled tower on the vertical part of the foundation. The circular structure rises vertically towards the surface and finishes well above the surface of the water.

This detail is illustrated in drawings.

The vertical piled tower that will be composed of a steel or concrete tower will have a height between 70 and 120 especially about 90 meters according to the dimensions of the foundation described herein, above which must be added the 40 to 60 meters of one of the wind turbine blades when in vertical position.

In fact, for a tower measuring between 70 and 120 meters in height, approximately 40 to 50 meters will be left free from the surface of the water, since the rest of this space is occupied by blades of the wind turbine, two or three in number, that inscribe an ideal circle with a diameter ranging between 80 and 120 meters.

The steel tower can be attached to the foundation using a "female" base that rises vertically for a height that varies according to the position of the installation and the specific atmospheric conditions in the area, but in any case, in proportion with the width of the foundation to which it is attached.

The positioning of the piled tower will be performed on site with a minimum of labour intervention, since the operation is performed by an auxiliary crane that permits an easy tower installation, using the fixed platform as support, instead of using Jack-ups or crane ships. This tower does not need to be realised previously because of the necessity for involved installation methods, but can even be realised on site, thus contributing to cost reduction even further by saving on transport.

Each wind turbine positioned in one or more parallel lines will be equipped with a generator located at the top in the nacelle.

Each unit will be connected to the other units.

The interior of the turbine tower will be hollow to permit the passage of the electrical installation that will collect the produced electricity to be sent to the shore using the substation connected to each single unit.

Also installed inside the piled tower is all the technical, technological and safety equipment needed for the installation itself, plus the food supply silos for the fish contained in the farming cages.

The nacelle positioned on the steel tower will be large enough to permit access for standard and non-standard maintenance operations.

A supplementary crane will be used for mounting the nacelle and for assembling the tower elements.

The generator that will be mounted on each wind turbine will provide for producing the electricity and transmitting from each individual connected unit to the shore through a substation.

The wind turbines—or wind mills—will be installed so that their horizontal axis or hub will be positioned at a height of approximately 70-120 e.g. 80 meters above the surface of the water.

This position permits greater exposure to wind in order to facilitate the eolian energy production.

The assembly operations for both the fish farming facilities and the wind turbine installation can be performed at different times, and also in sequence with each other, and in any case, directly on site in open sea, naturally after floating foundation has been transported and installed since this forms the base for the addition of the other structures.

Said assembly operations at sea can be facilitated by using mobile cranes for each individual installation group, providing even further savings in labour costs.

The installation realised using this method provides the great advantage of being ecology-friendly since it is limited to using and making the most of natural existing elements in a limited space and in a correct manner.

The invention is also especially advantageous for the fact that it uses limited space for carrying out activities of a certain economical importance, while fully respecting the environment at the same time.

The sequence of the successive constructive stages for the complete installation can occur at different times, and can be subject to various adaptations and modifications according to the geographical location of the installation.

Any said adaptations must however be in relation to the technological innovation protected by this patent.

DESCRIPTION OF THE DRAWINGS

The Figures, the Description of Working Mode and the Parts Lists are integral constituents with Specification and claims.

It is also possible to combine these two components in many other different ways: the mariculture cage 7 can be closed under the sea level and especially under the wave motion area 8, it can be in segments, which reproduce the geometry of the foundation body 6,21 or it may be independent cages 7 linked to the foundation body 6,21, on top or aside, or linked only to the counterweights 2 or it may be one large cage, both, with upper part floating on the sea level or closed under the sea level and especially under the wave motion area 8.

In the case of the mariculture cage 7 going up to the sea-level it is necessary to leave one segment open 26 (FIG. 3) or closed at a certain level under the sea-level in order to allow the landings on the working platform 9 of the unit.

The positioning of the horizontal body of the foundation 6,13,16 may follow primarily the criteria of securing maximum stability to the whole unit or also to the criterion of giving at the same time more volume to the mariculture cage 7 or cages. In this case the space between the sea level and the body of the floating foundation 6,13,16 is much more than it would be necessary to assure always the minimal hydrostatical thrust (as shown in FIGS. 1 and 4).

The steel version of the submerged floating foundation (6,13,16) is characterized by the tension cables 3, which provide the necessary stiffness to the steel body of the foundation 6.

The volume of the foundation body 6,13,16 is always dimensioned in a way to be able to compensate all acting loads and the weight of the foundation itself inside the water in order to produce always the necessary vertical thrust to confer stability to the system.

The tension chains or cables 3 assure the counteraction against the overturning moment and also stability of the platform against any direction of movement.

The solution of the counterweights 2 can be various according to the depth of the site and available facilities. One possible solution is to use concrete blocks with cavities inside, which allow a floating transport. The cavities in the blocks are at first floated partially in order to position the blocks on the ground and ones they are put in place, floated totally.

Solutions, which foresee a filling up with gravels, once put in place are also possible, up to a certain depth, as solutions, which combine gravity action with suction effect. Up to certain depth it is also possible to position the counterweights 2 inside the sea bottom 1, where it is possible.

Figure 2:
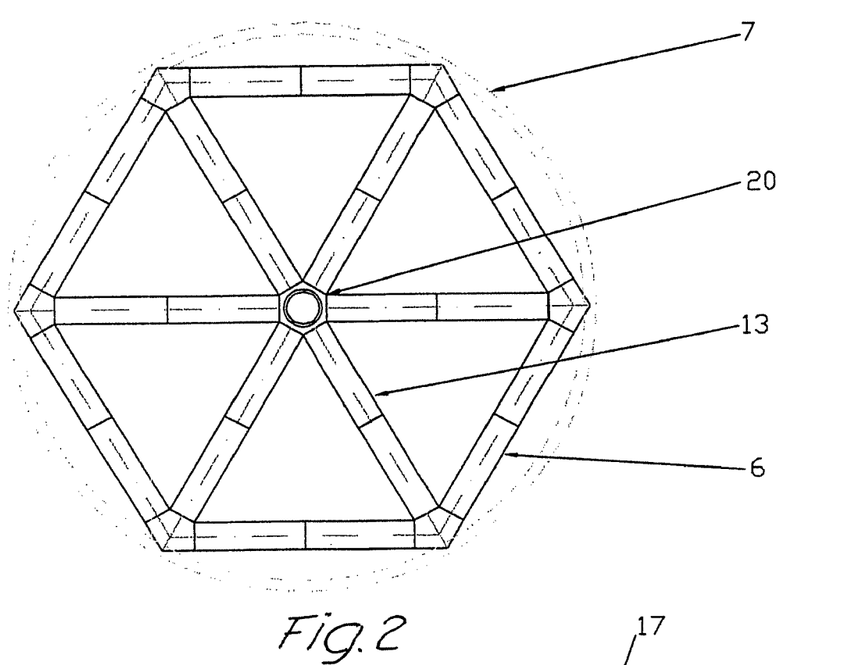
FIG. 2 is an illustration of the floating foundation in a hexagon configuration, but may have also more or less angles or be circular.
Figure 3:
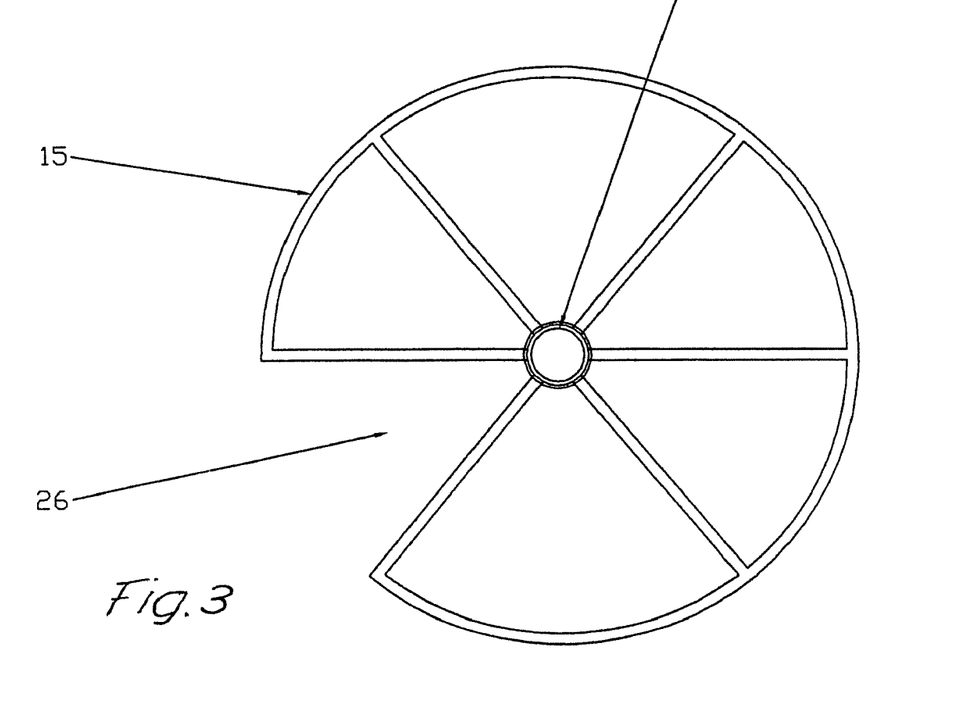
FIG. 3 is an illustration of the mariculture cage 7 going up to the sea-level where it is necessary to leave one segment open. The cage is closed at a certain level under the sea-level in order to allow the landings on the working platform 9 of the unit.

Both solutions, in steel (FIG. 1-3) and in concrete (FIG. 4-7), follow always the principle of hermetically closed segments in order to allow a floatation of the foundation even if water will penetrate in one of the segments.

One the other hand is the life cycle of the foundation much longer than that of the wind turbine and tower.

DESCRIPTION OF WORKING MODE

The submerged floating foundation 6,13,16 with blocked vertical thrust for the combined production of electricity form wind energy and of mariculture products has it's core in the function of the foundation 6,13,16, which allows to combine the two production activities on a stable support base in the open ocean also in deep waters of 200 m or more.

Figure 1:
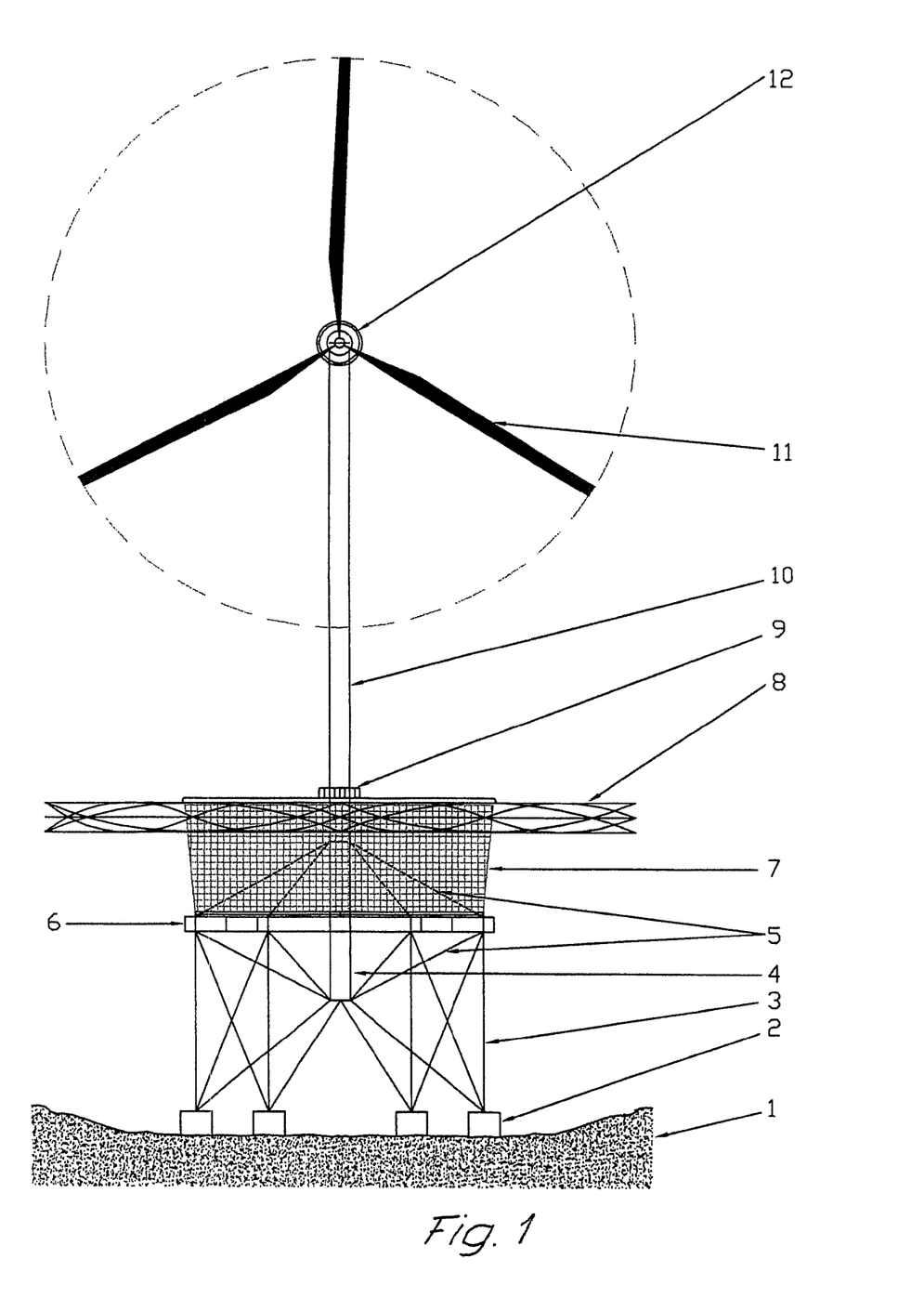
FIG. 1 shows all components of a submerged floating foundation in steel with a mariculture facility fixed on top of the horizontal part of the floating foundation showing one possible solution for the combination between the floating foundation and the mariculture facility 7. In this case the top of the cage has to follow the wave motion but also the whole cage can be linked through loops in a way that the cage 7 will follow the movements of the wave and is sufficiently elastic towards the fixed structure.
Figure 4:
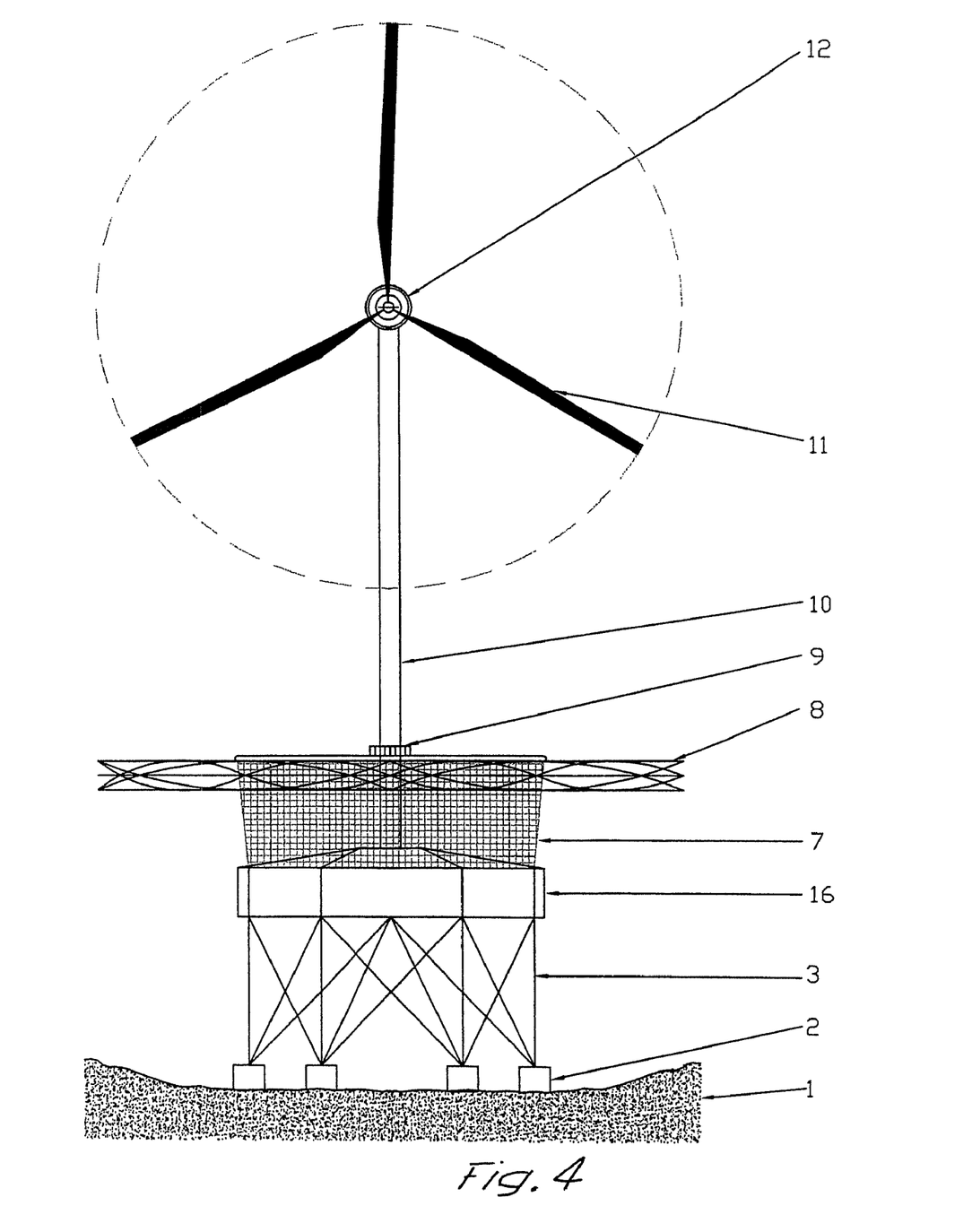
FIG. 4 shows the version in concrete, which differs essentially from the steel version in not having the lower part 4 for additional ballast to bring the centre of gravity of the whole system down, as the weight of the concrete foundation body (FIGS. 4, 5, 6 and 7) is much higher than that of the steel version.
Figure 5:
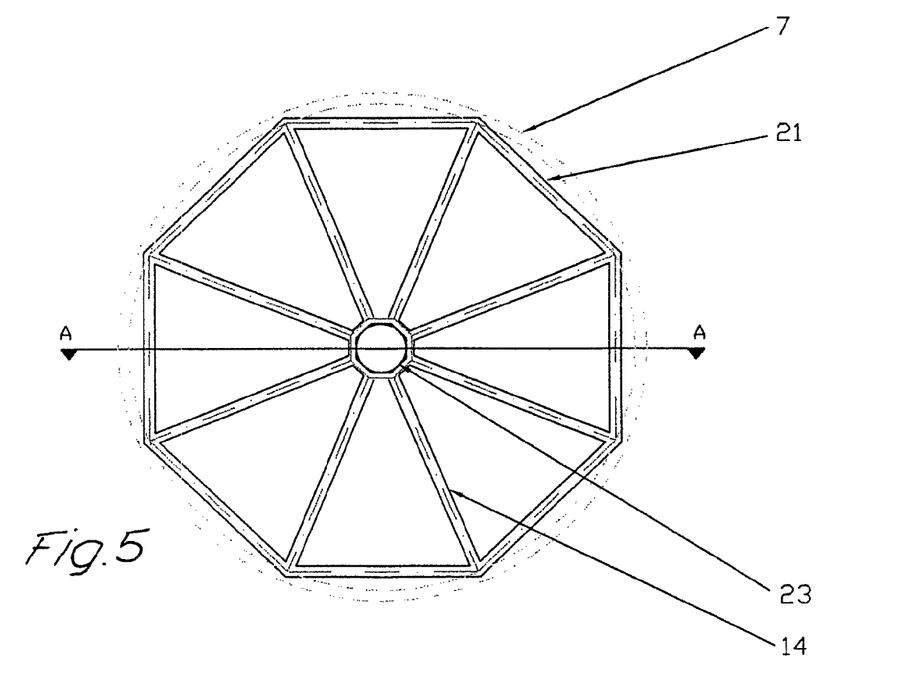
FIGS. 5, 6 and 7 illustrate the foundation, including the central body.
Figure 6:
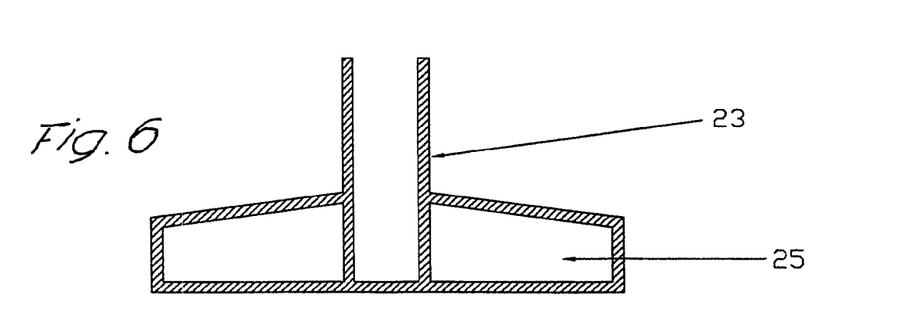
Figure 7:
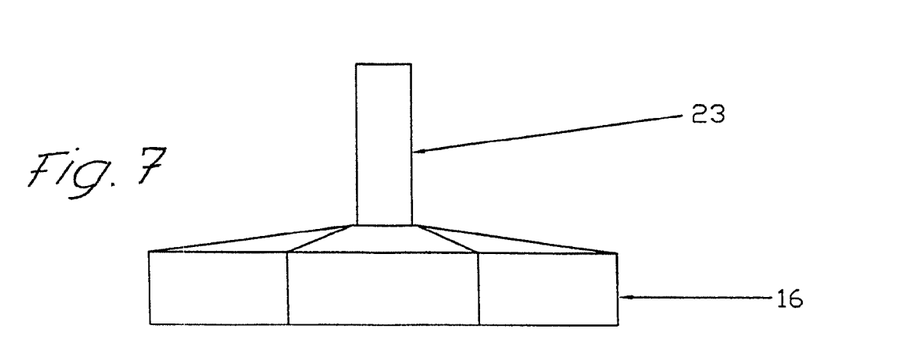

Basement and anchoring platform for the facilities of the two activities is the foundation body 6,13,16 as shown in the FIG. 1, 4, either in steel or in concrete.

In both cases is the working principle to counterbalance all loads, which act on the production facilities—coming from the wind, the waves and the marine currents—by the dynamic stability of the foundation body 6,13,16, which is the result of the combined action of the hydrostatic thrust and the counterforce exercised through the chains 3 and counterweights 2.

The stability of the system is assured by the dimensioning of the size and volume of the foundation body 6,13,16 in relation to the loads, which act both on the upper part in form of wind and waves and on the lower part of the system in form of marine currents.

In the worst case wind thrust and wave thrust act together in one direction, while marine currents act in the opposite direction. This determines the maximum of overturning moment exercised on the system.

The overturning moment is compensated by the action of always one of the chains or cables 3, in relation to the direction of the above mentioned loads. Although two neighbour chains act partially to compensate the overturning moment, it is preferred to dimension the chains 3 in a way that always one chain is able to compensate the maximum overturning moment.

Additionally the volume of the floating foundation 6,13,16 and the chains 3 are dimensioned in a way that the chains 3 are always pre-tensioned.

The minimum vertical trust of the whole foundation below sea level in case of the highest possible wave (smallest displaced water volume) has to be equal to reach the equilibrium of all involved actions, including the proper weight of the system and the increase of the weight due to formation of algae etc. during the time.

Additional ballast, to be placed in the lower part of the central body of the foundation 4 (FIG. 1), act to lower the centre of gravity of the system.

The operation of the mariculture facilities 7 gains from having at disposal electricity in the open sea from the wind turbine to operate automatic feeding and control systems, as well as cranes for lifting weights. A first packaging and production of ice for chilling of the fish is possible having electricity on board of the platform 9.

The operation of the wind turbine gains from the presence of workers in running the mariculture facility 7 as well as sharing the transport vessels in case of normal maintenance and smaller spare part transportation.

Both productive activities gain from sharing one common support structure and one common mooring system, as well as from sharing man power.

The environment gains from the concentration of two strongly expanding activities in the oceans into the same area, reducing substantially the areas needed for the two activities, if operated separately.

Security in navigation is improved by the light signals of the wind turbine, whereas offshore mariculture farms do not provide such signals.

Installation of the system is simple and economic and represents the lowest possible impact on to the marine environment, no drilling or action of hammers, no use of Jack-ups is necessary.

Removing of the whole system at the end of the life-cycle is extremely simple and economic and does not interfere at all in the environment, as the counterweights 2 will have to remain in place, being already part of the marine environment and improving the habitat.

The solution of the submerged foundation allows generally to go into deeper waters and therefore to move the two production facilities farer outside and therefore out of the visual impact.

At the same time it is possible to improve the economic results of the two activities due to higher wind speed far from shore and to better water quality, especially higher oxygen rate as well as solving the problem of the impact of the excrements in near shore fish farming.

PARTS LIST

1. Sea bottom
2. Counterweights
3. Chains or cables
4. Lower part of central body with ballast
5. Tension cables to provide stiffness to the foundation body
6. Foundation, body, external body
7. Mariculture facility; cage (either to sea level or closed under sea level)
8. Wave motion area
9. Working platform
10. Turbine tower (strut)
11. Turbine blades
12. Turbine nacelle and rotor hub
13. Radial arm, body
14. Structural wall between the segments
15. Mariculture cage segment (in case of mariculture top floating upon sea level)
16. Foundation, lateral view of central body with segments, body
17. Working platform on conjunction between turbine tower and top of central body of floating foundation
20. Central body
21. Segment of foundation body in concrete
23. Central body
25. Cross section view of central body with segments
26. Access segment for landing to working platform (in case of mariculture cage top floating upon sea level)

The invention claimed is:

1. A method of implementing a buoyant foundation operable to support a load composing:
   immersing a buoyant foundation body below a wave motion area of water;
   disposing a turbine tower having a wind turbine on an upper part of the foundation body; and
   attaching a counterweight to the foundation body using a tension cable, operable to bias the foundation body against thrusting vertically into the wave motion area.

2. The method of claim 1 further comprising:
   controlling the depth of the foundation body in the water through adjustment of the counterweights.

3. The method of claim 1 further comprising employing an anchoring system extendable from the body and contacting a surfacing of a floor of a body of water.

4. The method of claim 1 further comprising:
   connecting electrical generating equipment to the wind turbine; and
   utilizing the wind turbine to generate electricity.

5. The method of claim 4 further comprising attaching a fish farming installation to the foundation body.

6. The method of claim 1, further comprising adjusting the buoyancy by increasing or decreasing an amount of gas in the foundation body of the foundation body in the water.

7. The method of claim 6, wherein the gas is air.

8. A buoyant foundation comprising:
   a foundation body having a lower submergible buoyant part operable to be submerged below a wave motion area of a body of water, the foundation body comprising an upper part comprising a wind turbine extending therefrom and operable to extend above a surface of the water, and further comprising a first tension cable tethered to the upper part and tethered to the foundation body, and at least one counterweight, tethered to the foundation body, operable to bias the foundation body against thrusting vertically into the wave motion area and operable to be disposed on a surface of a floor of a body of water, wherein the upper part further comprises a chamber for an electrical installation to control the wind turbine, and at least one storage chamber.

9. The invention of claim 8 further comprising an anchoring system extending from the foundation body and the surface of a floor of a body of water wherein said anchoring system is adapted to retain the foundation body submerged below the wave motion area of water.

10. The invention of claim 9 said anchoring system comprising a tethering device connected to a counterweight contacting the surface of the floor of a body of water.

11. The invention of claim 10 wherein said counterweight is adapted to have adjustable buoyancy.

12. The invention of claim 8 wherein the foundation body comprises a chamber fillable with water and optionally gas.

13. The invention of claim 8 wherein the foundation body is operable as a base for attaching a fish farming installation.

14. The invention of claim 13 wherein the fish farming installation composes a cage or a net.

15. The invention of claim 8, wherein the lower part of the foundation body comprises a polygonal or circular hollow body surrounding a central body, arranged around a central part adapted to extend vertically from the lower part beyond the upper part.

16. The invention of claim 15, wherein the lower part comprises a ring-shaped hollow body and a plurality of radially arranged hollow arms connecting the ring-shaped hollow body to the central body.

17. The invention of claim 16, wherein a fish farming device is located between the lower part of the foundation and the surface of the water.

18. The invention of claim 17, wherein the fish farming device comprises at least one fish farming cage disposed around the central body.

19. The invention of claim 18, wherein the at least one fish farming cage has the form of a polygon and is arranged between the radial arms and two hollow bodies.

20. The invention of claim 8, wherein the foundation body is constructed as a single piece with a plurality of integrated hollow chambers.

21. The invention of claim 8, wherein the outside form of the lower part is hexagonal.

22. The invention of claim 8, wherein the wind turbine further comprises an electrical energy production component, and wherein the electrical energy is operable to power an automatic fish feeding-related service, of the foundation.

23. The buoyant foundation of claim 8, wherein the lower buoyant part is submerged below the wave motion area of the body of water, the wind turbine extends above the surface of the water, and the at least one counterweight is tethered to the foundation body with at least the second tension cable, the at least one counterweight is disposed on the surface of the floor of the body of water and biases the foundation body against thrusting vertically into the wave motion area.

* * * * *